United States Patent [19]
Summers

[11] Patent Number: 5,808,990
[45] Date of Patent: Sep. 15, 1998

[54] METHOD AND APPARATUS FOR CONTROLLING THE LINEAR VELOCITY BETWEEN AN OPTICAL HEAD AND A ROTATION DISK

[75] Inventor: G. Clayton Summers, Foot Hill Ranch, Calif.

[73] Assignee: Cinram, Inc., Anaheim, Calif.

[21] Appl. No.: 767,968

[22] Filed: Dec. 17, 1996

[51] Int. Cl.⁶ .................................................. G11B 5/09
[52] U.S. Cl. ............................................. 369/50; 369/53
[58] Field of Search ......................... 369/50, 58, 54, 369/51, 53, 32, 33

[56] References Cited

U.S. PATENT DOCUMENTS

| | | | |
|---|---|---|---|
| 4,190,860 | 2/1980 | Somers et al. | 358/128.5 |
| 4,228,326 | 10/1980 | Dakin et al. | 179/100.1 |
| 4,439,849 | 3/1984 | Nabeshima | 369/50 |
| 4,672,595 | 6/1987 | Senso | 369/50 |
| 4,757,489 | 7/1988 | Yamagishi | 369/50 |
| 4,841,511 | 6/1989 | Suzuki et al. | 369/50 |
| 5,010,540 | 4/1991 | Fuji et al. | 369/50 |
| 5,051,976 | 9/1991 | Kawano et al. | 369/50 |
| 5,111,305 | 5/1992 | Yamashita | 369/50 |
| 5,161,142 | 11/1992 | Okano | 369/50 |
| 5,216,650 | 6/1993 | Noguchi | 369/50 |
| 5,289,448 | 2/1994 | Sato | 369/50 |
| 5,315,571 | 5/1994 | Maeda et al. | 369/50 |
| 5,412,629 | 5/1995 | Shirane | 369/50 |
| 5,420,841 | 5/1995 | Hwang | 369/50 |
| 5,590,105 | 12/1996 | Enami et al. | 369/50 |
| 5,621,710 | 4/1997 | Koo | 369/50 |
| 5,627,811 | 5/1997 | Morita et al. | 369/50 |
| 5,642,342 | 6/1997 | Murata | 369/50 |
| 5,646,921 | 7/1997 | Yokota et al. | 369/50 |

FOREIGN PATENT DOCUMENTS

| | | |
|---|---|---|
| 49-16409 | 2/1974 | Japan . |
| 52-40308 | 3/1977 | Japan . |

*Primary Examiner*—Tan Dinh
*Attorney, Agent, or Firm*—Brinks Hofer Gilson & Lione

[57] ABSTRACT

An improved method and apparatus for maintaining a recording head in an optical recording system at a constant linear velocity relative to a rotatable disk support. A rotation controller uses a cumulative measure of rotation to determine an angular velocity of the rotating disk support necessary to maintain a constant linear velocity.

15 Claims, 7 Drawing Sheets

METHOD AND APPARATUS FOR CONTROLLING THE LINEAR VELOCITY BETWEEN AN OPTICAL HEAD AND A ROTATION DISK

This patent document makes reference to an appendix, which includes a listing of the object code version of the software, as well as schematics of the hardware for practicing a preferred embodiment of the invention. A portion of this disclosure contains material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention is directed to the field of disk recording systems, and more specifically to a method and apparatus for controlling linear velocity in an optical recording system.

BACKGROUND OF THE INVENTION

Optical recording systems for devices such as the popular compact disc (CD) typically have an optical recording head positioned in close proximity to a rotating disk supporting the recording medium. As the disk rotates, an information signal is recorded on the recording medium via a transducer on the recording head as the recording head moves in a substantially radial direction across the surface of the recording medium. Early recording systems were implemented with the recording medium rotating at a constant angular velocity. Constant angular velocity systems are simple to implement because a motor rotating the recording medium at a constant angular velocity does not require complex speed control once the selected motor velocity is reached.

One problem associated with constant angular velocity systems is the inefficient manner in which data is stored. The density of the data recorded on the disk at a constant angular velocity varies according to the position of the optical recording head. As the recording head approaches the outer perimeter of the disk, the linear velocity is actually increasing. As a result, the data stored closer to the perimeter of the disk takes up more space than data stored closer to the center of the disk.

A more uniform storage density may be achieved by maintaining the recording head at a constant linear velocity relative to the rotating disk support during recording. A price is paid, however, in the added complexity of constant linear velocity systems. In order to maintain a constant linear velocity, the angular velocity of the rotating recording medium must be repeatedly updated according to changes in the position of the recording head. Constant linear velocity systems are further complicated by the need to record information in regions of the disk having dimensions on the order of microns.

Current constant linear velocity systems are limited in accuracy. One current implementation tracks the radial position of the optical head in relation to the disk support and updates the angular velocity of the disk support in relation to changes in radial position. This approach is limited in accuracy by the relatively short travel distance in the radial direction.

Other systems make use of position indicators placed on the substrate of the recording medium to update the angular velocity. The position indicators are sensed by the optical recording head during the process of recording. As each indicator is sensed, the system sets the angular velocity to keep the linear velocity constant relative to the radial position.

Despite the improved accuracy, there are disadvantages to using position indicators. First, as new optical formats using smaller recording spot sizes develop, position indicators become less practical. In addition, the preparation of the recording media prior to the recording step further complicates the fabrication process. Moreover, the technique may not be appropriate for all optical formats.

It would be preferable to implement a constant linear velocity scheme in which the angular velocity can be updated on a more continuous basis than current systems. It would also be preferable to implement a constant linear velocity scheme without affecting the recording medium in the process.

SUMMARY OF THE INVENTION

In view of the above, the present invention is directed to an improvement to an optical recording system including an optical recording head and a rotatable disk support positioned in close proximity to the optical recording head. The rotatable disk support is movable along a first path comprising a radial component from an initial radial position by a translation motor. A disk motor coupled to the disk support rotates the disk support at a selectable angular velocity. A motion sensor is coupled to the disk support and operates to generate a sensor signal indicative of rotation of the disk support.

The improvement includes a translation controller operative to move the disk support along the first path. The improvement also includes a rotation controller responsive to the sensor signal and operative to determine a cumulative measure of rotation. The rotation controller sets the disk motor angular velocity as a function of the cumulative measure of rotation in order to control linear velocity between the recording head and the rotating disk.

In another aspect of the present invention, a method is provided for maintaining a radially movable rotatable disk support at a constant linear velocity relative to an optical recording head with the rotatable disk rotating at a selectable angular velocity. The method includes the step of moving the rotatable disk from an initial radial position along a radial path at an initial radial velocity. The method further includes the step of rotating the rotatable disk at an initial angular velocity. The cumulative measure of rotation of the rotating disk is determined and the angular velocity of the rotating disk is updated in response to the cumulative measure of rotation to maintain the constant linear velocity.

DETAILED DESCRIPTION OF THE PRESENTLY PREFERRED EMBODIMENTS

Preferred embodiments of the present invention will be described with reference to the drawings, where like numerals refer to like parts throughout.

Preferred embodiments of the present invention provide an improved optical recording system that maintains a recording head at a constant linear velocity relative to a rotating disk. Although embodiments of the present invention are implemented in optical recording systems, it is to be understood that embodiments of the present invention may be implemented in any data storage system in which a transducer mounted on a head scans a rotating medium at a selected linear velocity.

An example of a preferred embodiment of the present invention is provided in Appendices 1 & 2. Appendix 1 illustrates one example of an interrupt service routine and other software components of a preferred embodiment. The program is written in the C++ programming language and is designed to operate in the WINDOWS™ operating system. Appendix 2 illustrates schematics of an implementation of a translation and a rotation controller of a preferred embodiment. The controllers may be implemented on a circuit board that interfaces with a WINDOWS™ computer via an open slot on the peripheral bus system.

Figure 1:
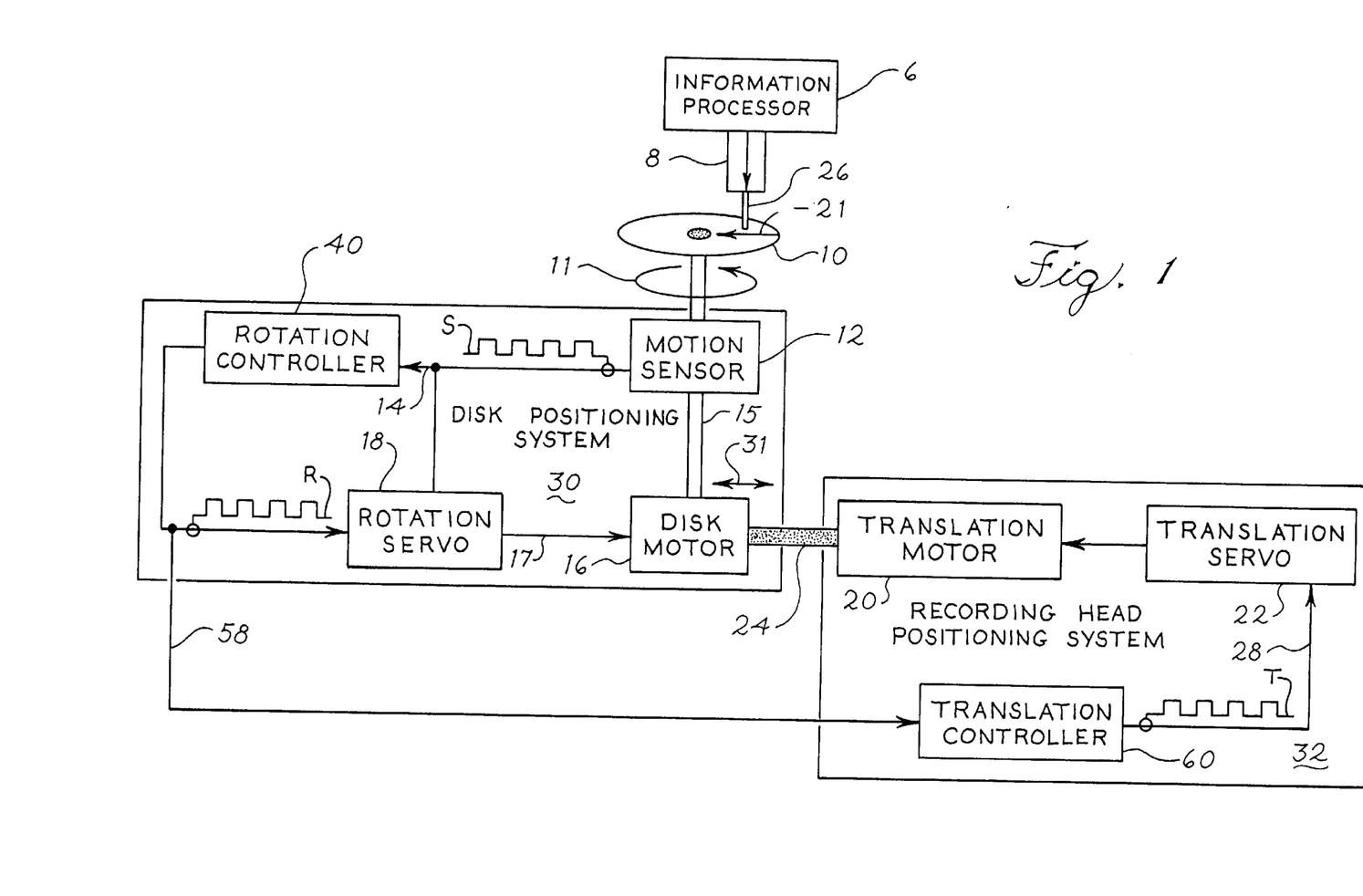
FIG. 1 is a block diagram of a preferred embodiment of the present invention.

FIG. 1 is a block diagram of a preferred embodiment of an optical recording system in which a rotatable disk support 10 moves in a linear direction in close proximity to an optical recording head 26. The translational motion of the rotatable disk support 10 combined with the rotation of the disk support 10 causes the recording head 26 to scan at a constant linear velocity relative to the rotatable disk support 10.

The disk positioning system 30 includes a rotation controller 40, a rotation servo 18, a disk motor 16 and a motion sensor 12. The rotation controller 40 generates a rotation control signal R on line 58, which connects the rotation controller 40 to the rotation servo 18. The rotation servo 18 senses the rotation control signal R and generates the motor control signals on line 17. The motor control signals on line 17 drive the disk motor 16 in accordance with the rotation control signal R.

The rotation controller 40 connects to the motion sensor 12 via line 14. The motion sensor 12 generates a sensor signal S on line 14 to provide the rotation controller 40 with an indication of the current angular velocity as well as a measure of rotational displacement of the rotatable disk support 10. In a preferred embodiment, the motion sensor 12 includes a tachometer, such as an optical encoder with a transducer which generates an electronic pulse stream as the sensor signal S. The frequency of the sensor signal S is indicative of the angular velocity of the rotatable disk support 10. The pulse count of the sensor signal S is indicative of the rotational displacement of the disk support 10. In a preferred embodiment, one complete revolution of the disk support 10 is indicated by 525 pulses of the sensor signal S.

The rotation controller 40 determines a cumulative measure of rotation of the rotatable disk support 10 each time an incremental rotational displacement is indicated by the sensor signal S. The rotation controller 40 uses the cumulative measure of rotation to determine an updated angular velocity that will maintain the rotatable disk support 10 at a constant linear velocity relative to the recording head 26. The rotation controller 40 then generates a rotation control signal R indicative of an updated angular velocity. The rotation control signal R preferably comprises a digital pulse stream with a frequency value indicative of the angular velocity.

The rotation control signal R is sensed by the rotation servo 18 which translates the rotation control signal R into the motor signals that drive the disk motor 16 in accordance with the rotation control signal R. The rotation servo 18 also senses the sensor signal S and uses the sensor signal S as feedback. In a preferred embodiment, the rotation servo 18 will drive the disk motor 16 one revolution per 525 pulses received as the rotation control signal R. An example of a rotation servo 18 that may be used in a preferred embodiment includes a Model BDC 0610 from MFM Technology, Inc.

The disk motor 16 includes a motor shaft 15 connected to the rotating disk support 10. The motion sensor 12 is connected to the rotating system to sense the rotation of the disk support 10. Although the sensor 12 in FIG. 1 is illustrated as being mounted on the motor shaft 15, the motion sensor may connect to any suitable part of the rotating mechanism.

The disk motor 16 preferably includes a phase-locked, three-phase DC motor. Other motors, such as stepper motors, may also be used provided they can maintain the accuracy required by the optical recording system.

The recording head positioning system 32 includes a translation controller 60, a translation servo 22, a translation motor 20 and a linear motor shaft 24. The rotation control signal R generated by the disk positioning system 30 is sensed by the translation controller 60. The translation controller 60 then generates a translation control signal T at line 28 indicative of a translation velocity at which the rotatable disk support 10 must be moved to keep the optical head 26 positioned along a radial first path 21. The translation servo 22 senses the translation control signal T and drives the translation motor 20 at a velocity that corresponds to the translation control signal T. The translation motor 20 drives the linear motor shaft 24 to provide the translation of the rotatable disk support 10 along the radial path 21.

In a preferred embodiment, the translation motor 20 may include a linear motor and the translation servo 22 may include a digital servo. The translation control signal T comprises a digital pulse stream. The digital servo and the linear motor move the rotatable disk support 10 a distance of 1 micron along the radial path 21 for every 232 pulses received by the digital servo 22. The linear motor may use a coil to move the linear motor shaft 24 by stimulating the coil with pulses from the translation servo 22. An interferometer may be used to track the motor shaft translation and provide feedback of the linear motion to the translation servo 22. Alternative linear drive systems, such as systems using threaded shafts, or shafts mating with gears, may be apprehended by one of ordinary skill in the art.

The system in FIG. 1 operates with a recording medium (not shown) placed on the rotatable disk support 10. The recording head positioning system 32 drives the linear motor shaft 24, which causes the rotatable disk support 10 to move linearly. As the rotatable disk support 10 moves linearly, the recording head 26 follows the first radial path 21 on the rotatable disk support 10. As the recording head 26 moves (relative to the disk support 10), an information signal 8 is generated by an information processing system 6 and is recorded on the medium rotating with the rotatable disk support 10. The information is recorded on the recording medium on a substantially spiral second path (shown in FIG. 2) defined by the combined radial first path 21 of the optical head 26 and the rotation 11 of the disk support 10. A constant linear velocity is maintained during recording by controlling the velocity of the optical recording head 26 along the linear first path 21 and controlling the angular velocity of the rotatable disk support 10 in the rotating direction (as shown at 11).

Figure 2:
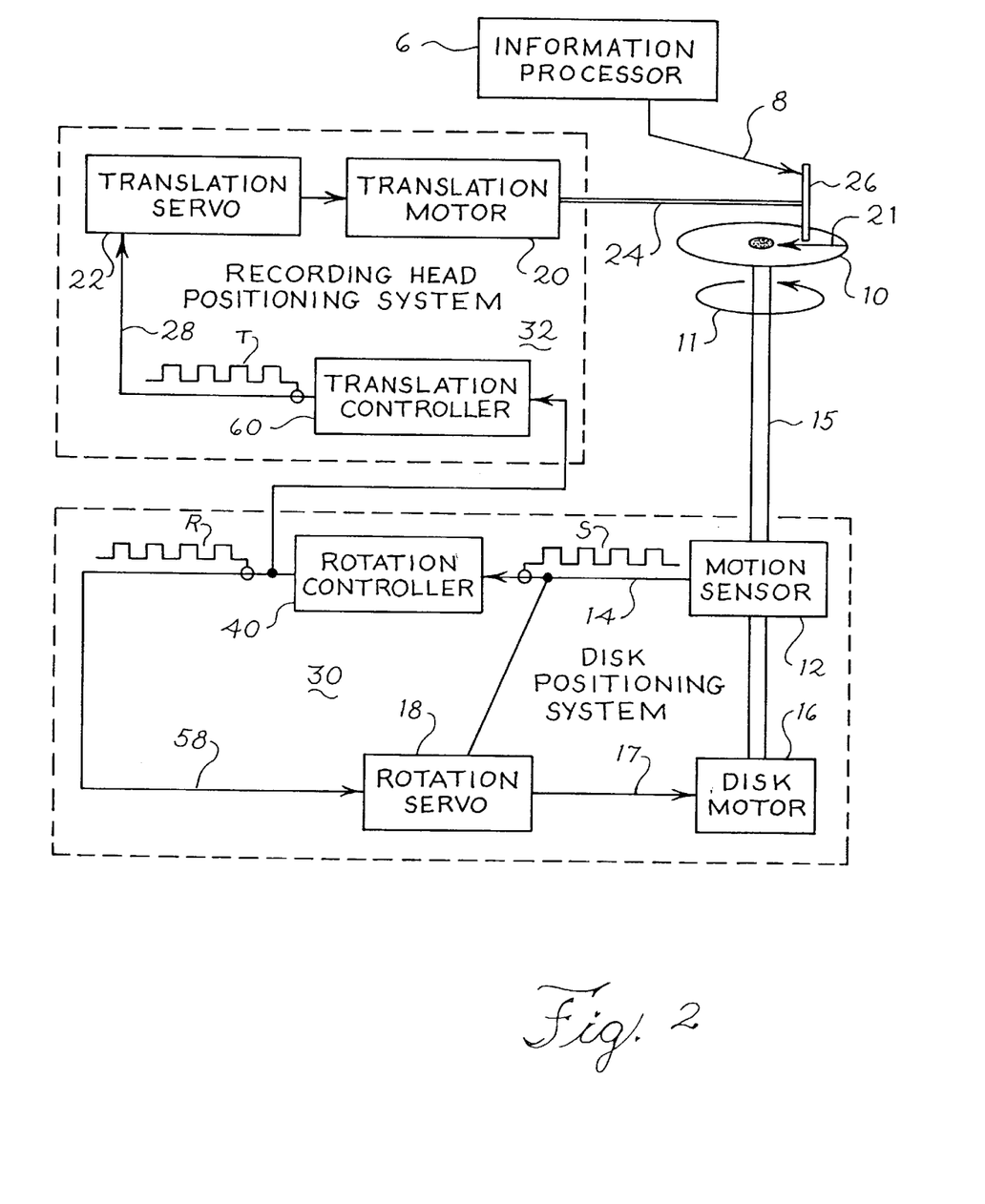
FIG. 2 is a block diagram of an alternative embodiment of the present invention.

In a preferred embodiment illustrated in FIG. 1, the optical recording head 26 is maintained stationary while the disk support 10 is moved angularly and linearly. A similar spiral path may be obtained if the disk positioning system 10 is maintained stationary and the recording head 26 is moved linearly. FIG. 2 is a block diagram of an alternative embodiment using the motion of the recording head 26 over a stationary rotatable disk support 10.

Figure 3:
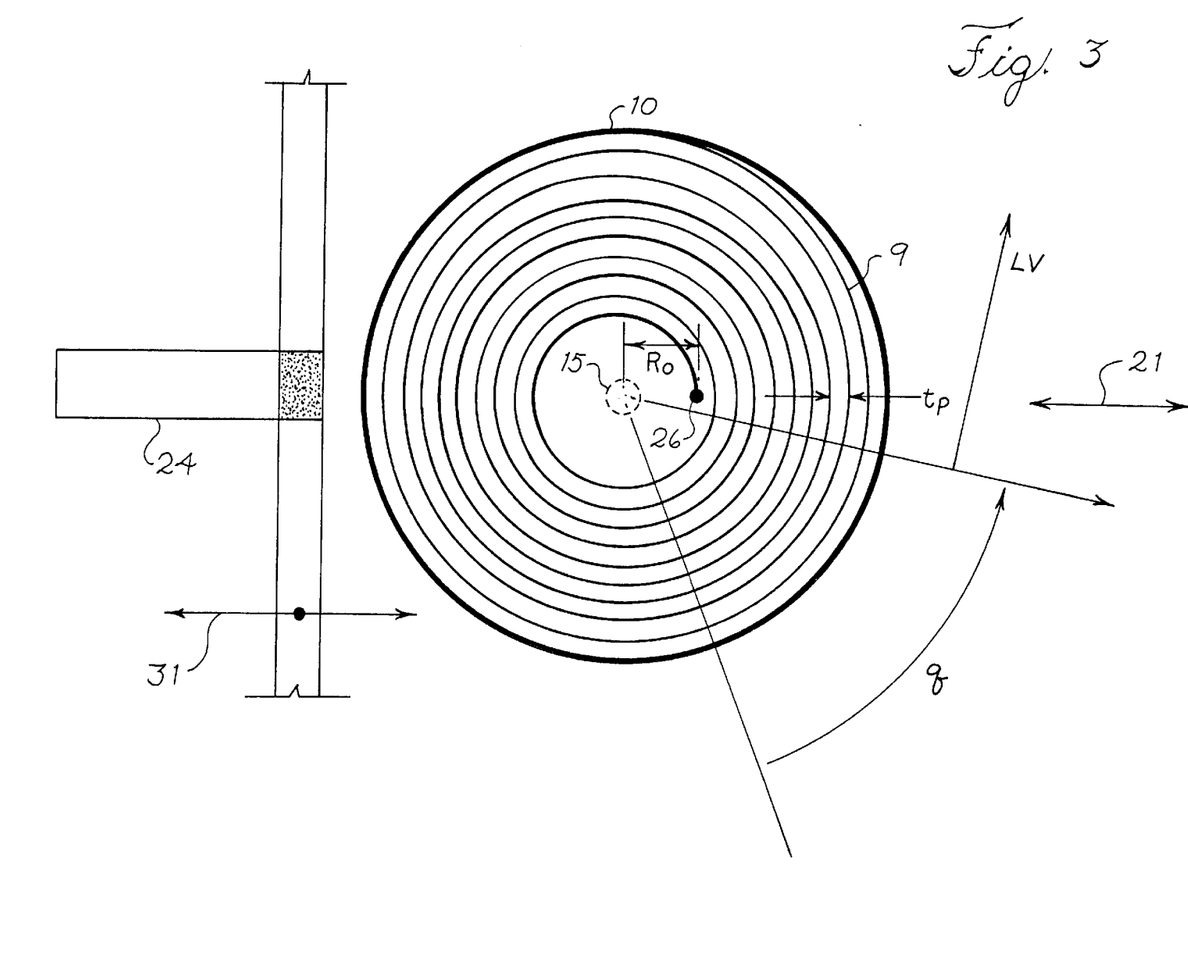
FIG. 3 illustrates a substantially spiral path defined by an optical recording head during the operation of the system illustrated in FIG. 1.

FIG. 3 illustrates how the geometry of a spiral path can be used to maintain a constant linear velocity. As shown in FIG. 3, the recording head 26 is positioned over the rotatable disk support 10. The linear motor shaft 24 is connected to the disk motor 16. As the linear motor shaft 24 moves, the disk support 10 moves along the radial path 21. The disk support 10 simultaneously rotates about the motor shaft 15.

The rotational displacement may be defined by an angular displacement represented in FIG. 3 by angle q. Since the optical head 26 is moving radially relative to the disk support 10, a spiral path 9 is defined on the disk support 10 as the disk support 10 rotates.

A constant linear velocity is achieved when the velocity represented by vector LV in FIG. 3 is maintained constant for all radial positions of the optical recording head 26. The disk positioning system 30 updates the angular velocity of the rotatable disk 10 at fixed increments of angle q, taking into account the initial radius, $R_o$ (defined as the point from which recording begins) and the track pitch $t_p$ (or the radial separation between adjacent tracks). By maintaining a cumulative angle q throughout the process, the linear velocity LV may be maintained constant from $R_o$ to the outer periphery of the rotating disk 10.

In general, the updated angular velocity, represented by $\omega$, may be calculated according to the following equation in revolutions per second:

$$\omega = \frac{2\pi LV}{2\pi R_0 + qt_p} \quad . \tag{Eq. 1}$$

The angular velocity of the rotatable disk support 26 is indicated by the frequency $F_R$ of the rotation control signal R, i.e. pulses/second. The rotation controller 40 determines the frequency of the rotation control signal R according to the following equation:

$$F_R = \frac{K_{Rot}\omega}{2\pi} \, , \tag{Eq. 2}$$

where $K_{Rot}$ denotes the number of pulses of the rotation control signal R in one revolution of the rotatable disk support 10. In a preferred embodiment, $K_{Rot}$=525 pulses/revolution.

During the recording process, the disk support 10 must be moved to allow the recording head 26 to track the current position on the spiral 9 in conjunction with the rotation of the disk 10. The disk support 10 may be moved linearly in conjunction with the rotation of the disk 10 by making the translation control signal T a function of the rotation control signal R according to the geometry of the system and the specifications of the components.

For example, in a preferred embodiment, the frequency $F_T$ of the translation control signal T may be determined according to the equation:

$$F_T = \frac{F_R \times t_p \times K_{Trans}}{K_{Rot}} \quad . \tag{Eq. 3}$$

As stated above, $K_{rot}$ is 525 pulses/revolution of the disk in a preferred embodiment, and $K_{trans}$, the number of pulses per micron of travel of the optical head 26 is 232 pulses/micron.

It will be apparent to one of ordinary skill in the art that the above-described relationships may be varied according to the specifications of the optical recording system. The constants $K_{Rot}$ and $K_{Trans}$ for example, are dependent upon the selected specifications of the embodiments selected for the rotation servo 18, the disk motor 16, the translation servo 22, the translation motor 20 and the linear motor shaft 24. The constants $K_{Rot}$ and $K_{trans}$ are preferably in terms of pulses/revolution and pulses/micron, respectively. In addition, variations, or alternatives to the relationships described above may be required where the angular velocity of the rotatable disk support 10 and the translation velocity of the optical head 26 (relative to the disk support 10) are represented by parameters other than frequency.

Figure 4:
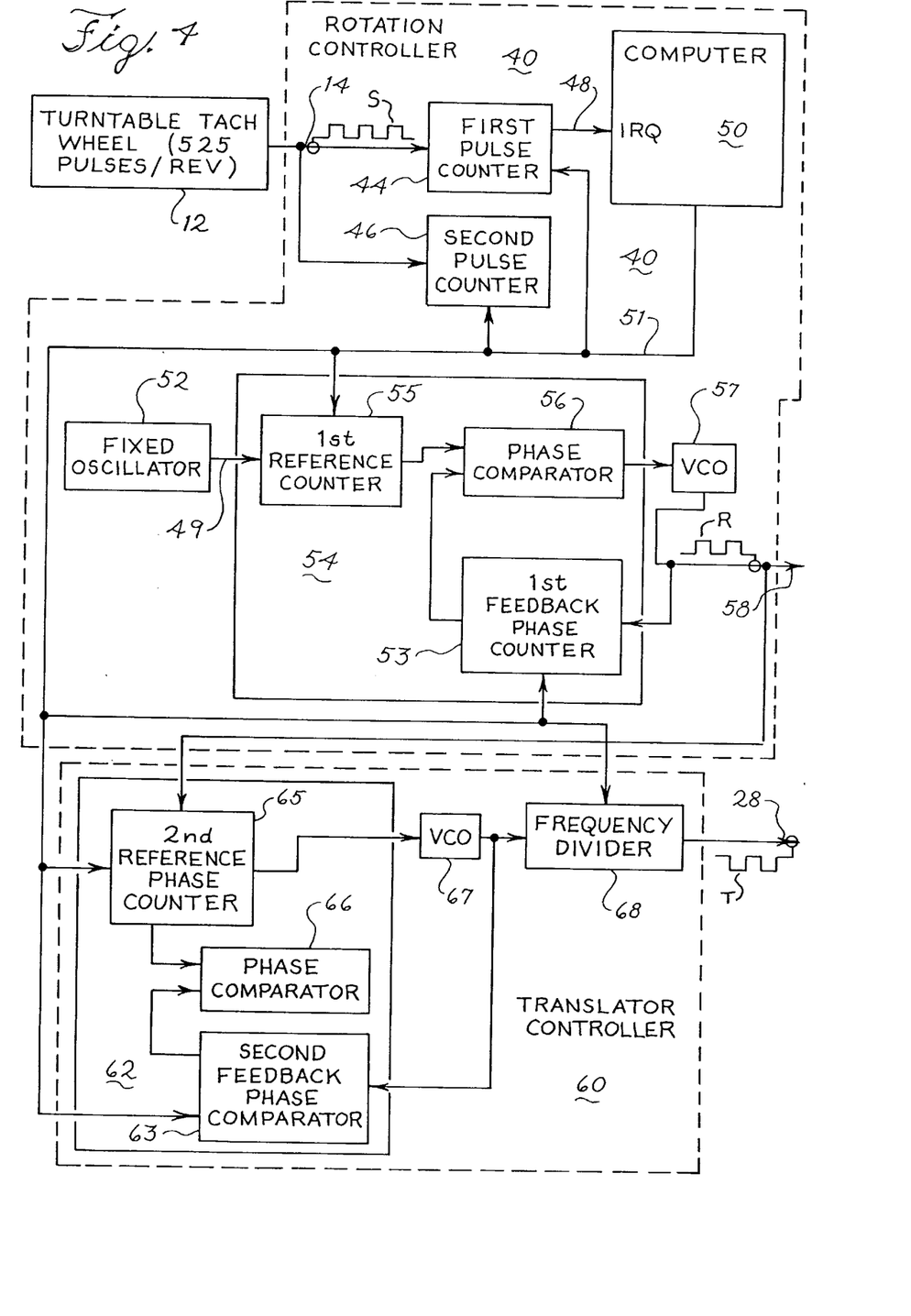
FIG. 4 is a preferred embodiment of the translational and rotational motion controllers in the optical recording system of FIG. 1.

The preferred embodiment of the rotation controller 40 and the translation controller 60 will be described with reference to FIG. 4. The rotation controller 40 includes rotation determining means comprising a first pulse counter 44, a second pulse counter 46 and a computer 50. In a preferred embodiment, the rotation determining means determines a cumulative measure of rotation and the computer 50 further determines an angular velocity for the rotatable disk support 10. The rotation controller 40 includes a fixed oscillator 52, a first frequency synthesizer 54 and a first voltage controlled oscillator (VCO) 57 for generating the rotation control signal R.

The computer 50 of a preferred embodiment includes a general purpose computer having a memory system, an interrupt input IRQ and an Input/Output (I/O) system for communicating via a data bus 51. The data bus 51 includes all signals necessary for addressing and providing data transfer to any component connected to the bus 51. The first and second pulse counters 44, 46 and the first and second frequency synthesizers 54, 62 are controlled by the computer via the data bus 51 as shown in FIG. 3. An interrupt service routine (described below) is configured to execute when the interrupt input IRQ is triggered. A preferred computer 50 operates using the WINDOWS™ Ver. 3.1 (or higher) operating system.

The rotation controller 40 is configured to receive a sensor signal S from the motion sensor 12 on line 14. The presently preferred motion sensor 12 includes a tachometer that generates a sensor signal S specified as 525 pulses/revolution. An example of a tachometer that may operate as a motion sensor 12 in a preferred embodiment includes an optical encoder having 525 mirrored surfaces around the perimeter of a disk. A light source is directed to the tachometer to reflect off the mirrored surfaces as the tachometer rotates. The reflections are sensed by a photo-detector in the optical encoder as pulses of light. A signal transducer converts the pulses of light into electronic pulse stream to produce the sensor signal S on line 14.

The first pulse counter 44 of the rotation controller 40 includes a digital counter, such as a divide-by-N counter, that receives the sensor signal S on line 14 and counts a pre-set number of pulses. The first pulse counter 44 may be initialized to count the pre-set number of pulses by the computer 50 via the computer data bus 51. Upon counting the pre-set number of pulses, the first pulse counter 44 generates a count indicator signal 48.

The count indicator signal 48 triggers an interrupt signal at the interrupt input IRQ of the computer 50. Accordingly, each time the count indicator signal 48 is received at IRQ of the computer 50, the interrupt service routine is executed by the computer 50. The interrupt service routine performs the operations described below with respect to the flowchart of FIG. 6. As described below with reference to FIG. 6, the operations performed in the interrupt service routine result in the calculation of the digital value indicative of an updated rotation control signal R. An interrupt service routine of a preferred embodiment is attached as Appendix 1.

The second pulse counter 46 senses the pulses of the sensor signal S on line 14 and keeps a count of all pulses received from the beginning of the recording operation. The second pulse counter 46 may be implemented by a software counter or by a hardware digital counter. The software counter includes a memory variable that is updated in the interrupt service routine each time the routine executes. Program steps in the interrupt service routine add the fixed number of pulses counted by the first pulse counter 44 to the cumulative count maintained in the memory variable.

The hardware counter implementation of the second pulse counter 46 may include a digital pulse counter connected to the computer 50 in a manner that would allow the computer 50 to set the counter 46 to zero at the beginning of the recording operation. The computer 50 may also read the current value of the counter 46 at any time during the recording operation.

The count indicated by the second pulse counter 46 at any given time represents the cumulative measure of rotation of the rotatable disk support 10. The advantage of a hardware counter is that the current cumulative measure of rotation is available if error recovery procedures are necessary, such as when an interrupt is missed. The software counter, on the other hand, can only provide the cumulative measure of rotation as of the last interrupt received.

The computer 50 retrieves the second pulse counter reading to obtain the cumulative measure of rotation. The computer 50 uses the cumulative measure of rotation and the relationships in Equations 1 and 2 to determine a numerical value of the frequency required to set the angular velocity of the rotatable disk support 10. The numerical value is converted to a digital frequency signal by a first phase-locked loop frequency synthesizer 54.

The first frequency synthesizer 54 includes a first reference phase counter 55 for receiving a fixed frequency signal 49 from a fixed oscillator 52. The first reference phase counter 55 is pre-set by the computer 50 via the data bus 51 to a digital value representing a multiple of the angular velocity of the rotatable disk support 10. The first reference phase counter 55 operates as a divide-by-N counter and counts pulses received from the fixed frequency signal 49 from the digital value to which it is preset. The first reference phase counter 55 then generates a signal upon completion of the count.

In addition, the interrupt service routine performed by the computer 50 outputs a multiplier to a first feedback phase counter 53 in the frequency synthesizer 54. The first feedback phase counter 53 operates in the same manner as the first reference phase counter 55 except that it counts the pulses of the rotation control signal R at line 58. The multiplier value in the first feedback phase counter 53 represents the value that would be multiplied by the value in the first divide-by-N counter 55 to yield the selected rotation control signal R at line 58.

When the first reference phase counter 55 and the first feedback phase counter 53 count down from their preset values, each generates a signal to the phase comparator 56. The phase comparator 56 receives the signals to compare the frequency values represented by the initial numerical values of the first reference phase counter 55 and the first feedback phase counter 53. The phase comparator 56 generates a signal indicative of the error that represents the difference between the two frequency values. The error signal is received by the first VCO 57 for conversion into the rotation control signal R at line 58. The phase comparator 56 indicates that there is no error when the frequency of rotation control signal R at line 58 is equal to the frequency determined in the interrupt service routine.

A preferred embodiment of a translation controller 60 includes a second frequency synthesizer 62, a second voltage controlled oscillator (VCO) 67 and a frequency divider 68. The second frequency synthesizer 62 includes a second reference phase counter 65, a second feedback phase counter 63 and second phase comparator 66. The translation controller 60 generates a translation control signal T on line 28. The rotation controller 40 is connected to the translation controller 60 via line 58. The second reference phase counter 65 of the second frequency synthesizer 62 receives the rotation control signal R as the reference frequency.

The second reference phase counter 65 and the second feedback phase counter 63 are initialized to constants that implement Equation 3 for a preferred embodiment. The track pitch is maintained at a constant value of approximately 1.6 microns. The translation motor 20 is specified to receive 232 pulses in order to move one micron. According to Equation 3, the track pitch $t_p$ is 1.6, $K_{rot}$ is 525 pulses/revolution and $K_{trans}$ is 232 pulses/micron. The frequency $F_T$ of the translation control signal T is therefore equal to the frequency $F_R$ of the rotation control signal R multiplied by 1.6, multiplied by 232 and divided by 525.

To implement the relationship of Equation 3 with the second frequency synthesizer 62, the second reference phase counter 65 is pre-set to 14 and the second feedback phase counter 63 is pre-set to the product of the track pitch $t_p$ and 99. The output of the second VCO 67, which is also the feedback signal counted by the second feedback phase counter 63, is then divided by the frequency divider 68. By presetting the frequency divider 68 to 16, the frequency $F_T$ of the translation control signal T follows the relationship in Equation 3.

As illustrated in Appendix 2, the first and second frequency synthesizers 54, 62 of a preferred embodiment each include a MC145145 phase-locked loop chip connected to an error integrator. The error integrator provides a voltage level that is used by the VCO to generate a frequency signal.

Figure 5:
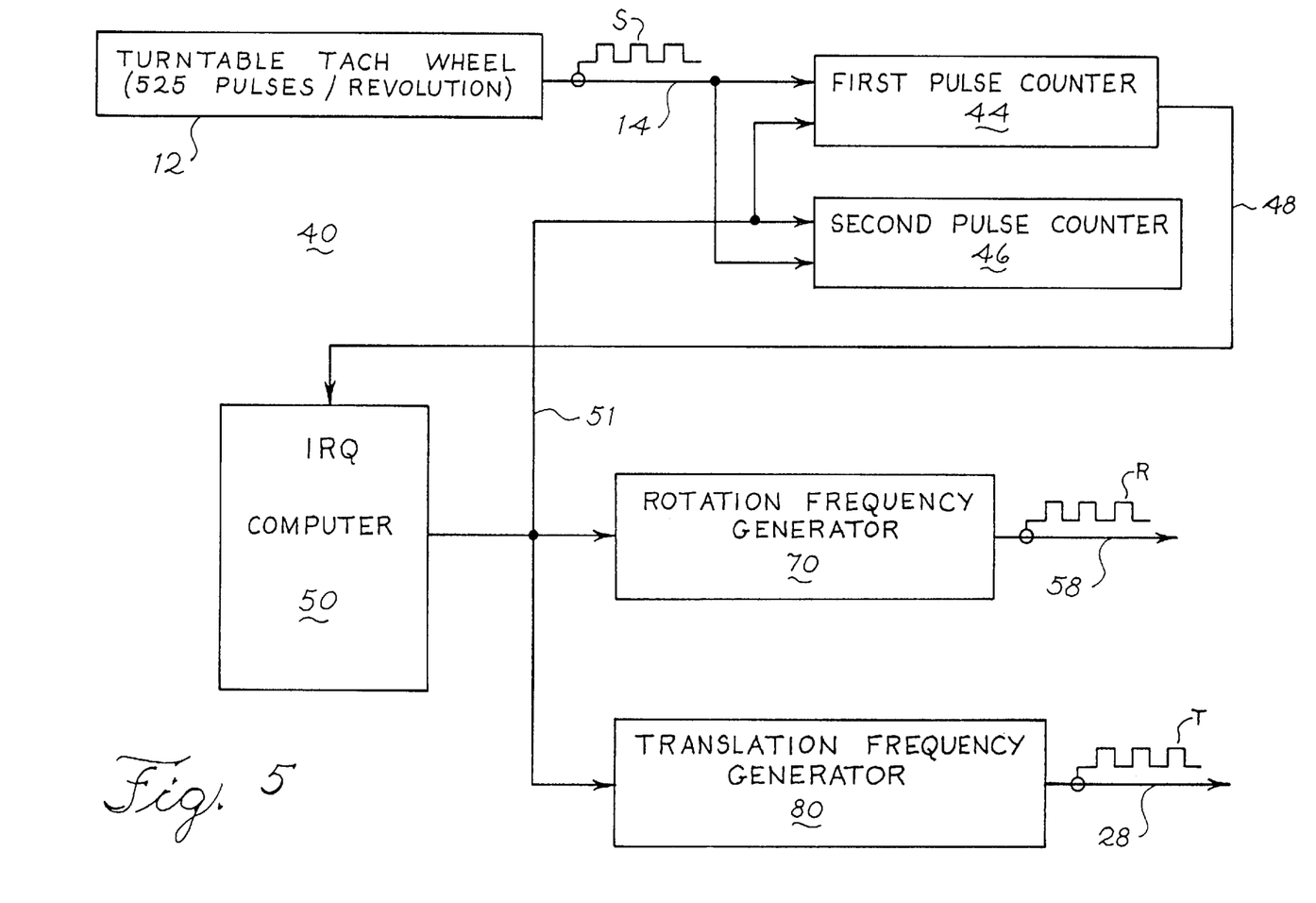
FIG. 5 is an alternative embodiment of the translational and rotational motion controllers in the system of FIG. 1.

Frequency generating systems that are adaptable to the needs of embodiments of the present invention may be implemented. FIG. 5 illustrates an embodiment in which the frequency synthesis components 52, 54, 57, 67 are replaced by a rotation frequency generator 70. The rotation frequency generator 70 is implemented using available function generator units such as the HP 3325B from Hewlett-Packard. The computer 50 updates the angular velocity of the disk motor 16 in the interrupt service routine in the same manner as is illustrated in FIG. 4. The computer 50 then outputs the updated numerical frequency value to the rotation frequency generator 70 via the data bus 51. The data bus 51 may be implemented using an HPIB bus which operates according to the IEEE 488 standard.

A translation control signal T on line 28 is generated by a translation frequency generator 80 in the same manner as the rotation control signal R on line 58. The Hewlett-Packard HP 3325B frequency generator described above includes two frequency generator channels. One channel generates the rotation control signal R on line 58 and the other channel generates the translation control signal T on line 28. The interrupt service routine determines the translation control signal T frequency value according to Equation 3 described above.

Figure 6A:
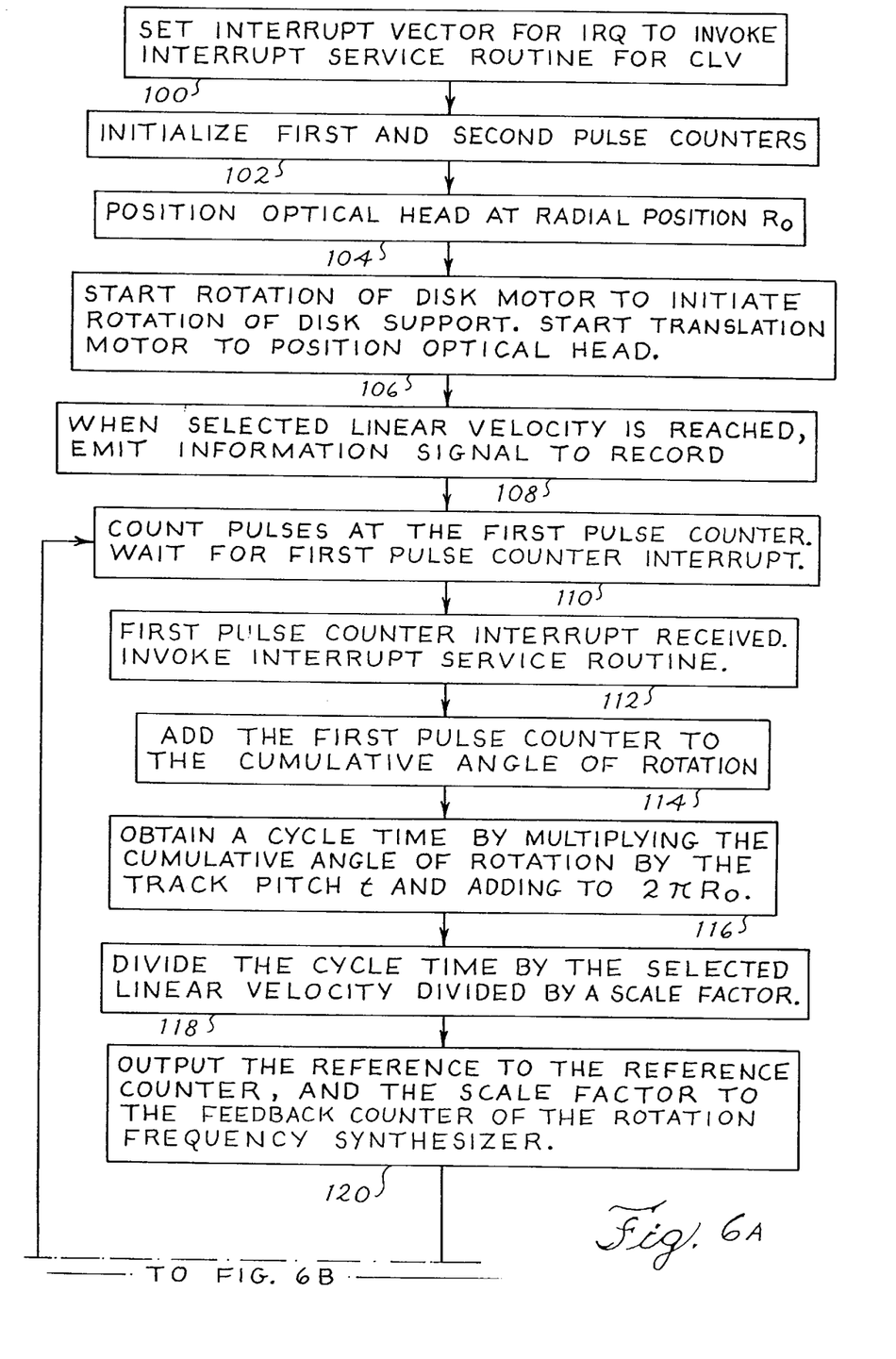
FIG. 6 is a flow chart describing a method for maintaining constant linear velocity in the optical recording system of FIG. 1.
Figure 6B:
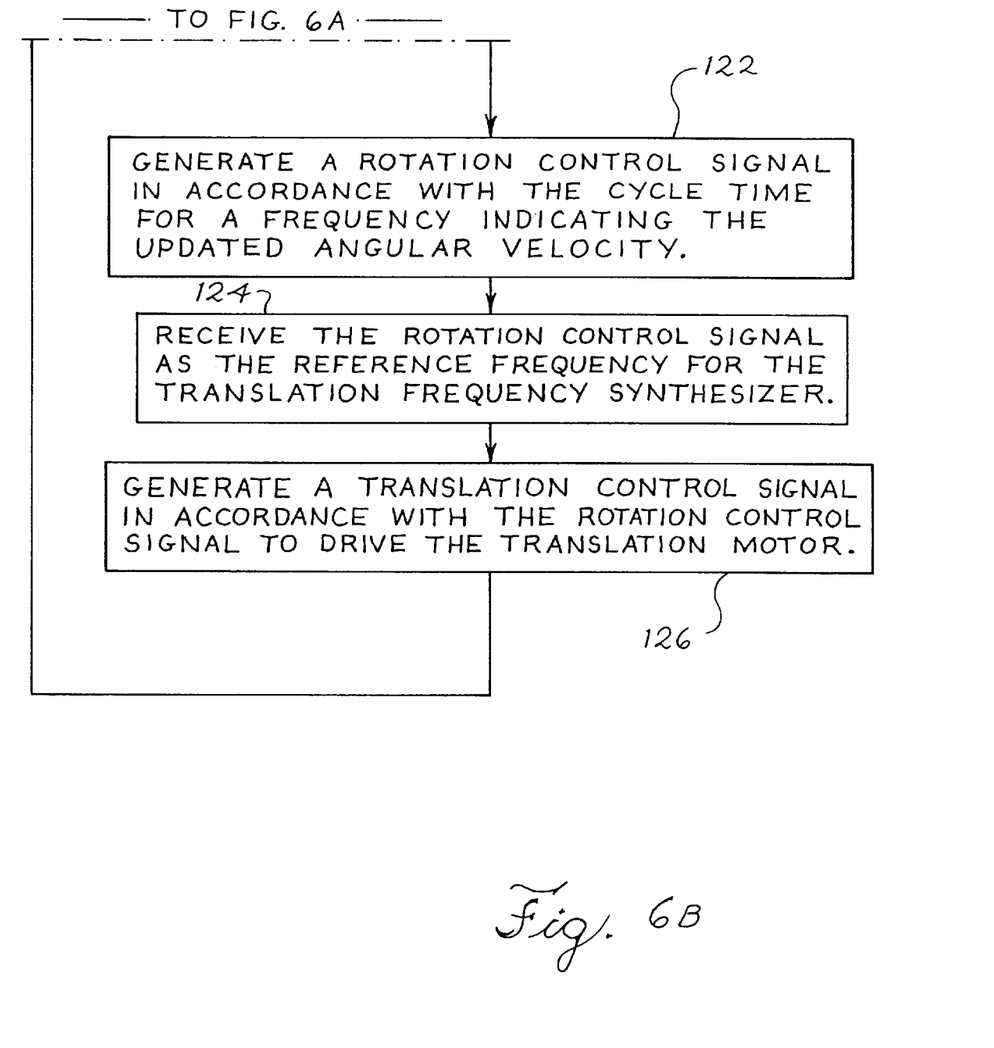

A method of maintaining a constant linear velocity in an optical recording system will be described with reference to the flowchart in FIG. 6. The method may be implemented by an apparatus described with reference to FIG. 1 using a rotation controller 40 and a translation controller 60 described with reference to FIG. 4. The method illustrated in the flow chart of FIG. 6 uses an interrupt service routine as described above.

An example of an interrupt service routine of a preferred embodiment is included in Appendix 1. The interrupt service routine in Appendix 1 implements a software counter for maintaining a cumulative measure of rotation. The routine may be revised to implement a hardware counter by replacing the step of adding the fixed count to the revolution count variable with an instruction to read a port addressing the hardware counter.

The method of maintaining a constant linear velocity includes certain steps that are carried out during initialization. The constant linear velocity interrupt service routine is set to be invoked at the appropriate interrupt level corresponding to the interrupt input IRQ as shown in block 100. The setting of the interrupt service routine depends upon the specific requirements of the operating system and of the computer 50 chosen to execute the interrupt service routine. Other steps that are carried out during system initialization include the initialization of the various counters, such as the first and second pulse counters 44, 46 as shown in 102. The first pulse counters 44 may require constant initialization from software, or it may be programmed to continuously cycle. The second pulse counter 46 is initialized to 0 once, and then read by the computer 50 during operation.

Once the system is initialized, the process starts by positioning the optical head at the radial position $R_o$ as shown at 104. The disk motor 16 and the translation motor 20 are then started as shown at block 106. When the selected linear velocity is reached, the information processor 6 emits the information signal 8 to start the recording process as shown at block 108.

In a preferred embodiment, the disk and translation motors 16, 20 may be controlled using known motor driver software elements. The process of recording typically involves starting the spiral path in motion and maintaining the spiral motion until the disk is recorded. As a consequence, the motors 16, 20 are initialized during initialization as part of the process of blocks 104 and 106. After initialization, the constant linear velocity system only updates the speed as described below.

Once the recording process is started, the rotation of the rotatable disk support 10 causes the pulses of the sensor signal S to be counted at the first pulse counter 44 as shown at 110. The control system waits for the count indicator signal 48 to be triggered by the first pulse counter 44.

When the first pulse counter 44 triggers a count indicator signal 48, the interrupt service routine is invoked as shown at block 112. Execution of the interrupt service routine begins with block 114 in which the value to which the first counter is initialized is added to the cumulative measure of rotation.

The interrupt service routine uses the cumulative measure of rotation to calculate a cycle time for the frequency necessary to set the disk motor 16 to an updated angular velocity. The first step in the calculation of the cycle time involves multiplying the cumulative measure of rotation, represented by angle q, by the track pitch $t_p$ and then adding the result to $2\pi R_o$ as shown at block 116. The track pitch $t_p$ in a preferred embodiment is maintained at a constant. A variable track pitch $t_p$ may be implemented by adding a track pitch input. An example of a track pitch input includes a program that calculates a variable track pitch according to the cumulative measure of rotation.

The present value of the cycle time is next divided by the selected linear velocity that has been divided by a scale factor as shown in block 118. The interrupt service routine then outputs the cycle time to the reference counter of the first phase-locked loop frequency synthesizer 54 of FIG. 3. The scale factor is output to the feedback counter of the first frequency synthesizer 54 as shown at block 120. The scale factor ensures that the rotation frequency 58 is the proper frequency representing a desired angular velocity.

The interrupt service routine described by blocks 114–120 calculates the reciprocal of Equation 2 discussed above for calculating the rotation control signal R. This is because the first phase-locked loop frequency synthesizer 54 compares the cycle time of two frequencies to obtain a phase difference.

Once the counters of the first frequency synthesizer 54 are loaded, the rotation control signal R is increased or decreased until the phase error between the reference and feedback counters reaches zero. At this point the frequency of the rotation control signal R is at the angular velocity needed to maintain a constant linear velocity given the cumulative measure of rotation.

The rotation control signal R is received by the translation controller 60 shown at block 124. The frequency synthesizer 62 of the translation controller 60 generates the translation control signal T as shown at block 126.

Once the angular velocity of the rotating disk 10 and the radial velocity of the optical head 26 have been updated, the disk 10 generates pulses at the sensor signal S. The system then waits for an interrupt at block 110.

Preferred embodiments of the present invention have been described in detail. It is to be understood, however, that it is the claims that define the invention. Alternative embodiments may be apprehended by one of skill in the art without departing from the scope of the invention.

For example, the preferred embodiments have been implemented assuming a spiral recording track. The recording track on the recording medium may be concentric circles approximated by a spiral path. Preferred embodiments of the present invention may therefore be used to provide a constant linear velocity.

In another example, alternative embodiments of the rotation controller 40 and the translation controller 60 may be implemented using different parameters to indicate velocity or displacement of either the disk 10 or the head 26. In the preferred embodiment described above, the measure of rotation of the rotatable disk support 10 is indicated by a digital pulse stream. In alternative embodiments, the measure of rotational travel may be indicated by a level such as a voltage level or a current level. In an example of another embodiment, a voltage level indication of displacement may cycle to produce a saw-tooth waveform. The saw tooth peak may be used as a count indicator signal and the levels between peaks as indicative of rotational displacement.

One of ordinary skill in the art can readily apprehend that a wide variety of circuits may be combined to carry out the functions of the rotation determining means. A wide variety of circuits may also be combined to generate the signal indicative of an angular velocity. Examples of such circuits include one-shot circuits, integrator circuits and other wave-shaping circuits.

In one variation of the rotation determining means of a preferred embodiment, the computer 50 updates the digital value of the rotation frequency 58 without utilizing an interrupt. Instead, the count indicator signal 48 is an input to a port that the computer 50 senses, or polls. The port is polled to determine if the port is at a level indicating that a count has been reached by the first pulse counter 44. The computer 50 then resets the port to a level indicating that the computer 50 is waiting for new count. The computer 50 must poll the port often enough to ensure that a new count is not triggered before the previous count is checked.

In another alternative embodiment, the rotation determining means is implemented without a computer 50. One of ordinary skill in the art can readily apprehend that the instructions carried out by the computer 50 in the interrupt service routine may be accomplished using a combination of digital and analog circuits. The angular velocity may also be generated using combinations of multipliers and digital registers. Furthermore, the angular velocity may be represented by a signal type other than a frequency in order to facilitate a computer-less embodiment.

In a variation of the motion sensor 12, the functions of the first and second counters 44, 46 may be integrated into the motion sensor 12. The integration of the components may yield a digital tachometer reading for the computer 50. In this variation, the data bus 51 of the computer 50 is connected directly to the motion sensor 12. The sensor signal S is thereby sensed by a computer program via the data bus 51.

Alternative embodiments may use alternative methods of generating a selected frequency. For example, a variable frequency may be generated by a variable oscillator. The frequency is varied by adjusting a potentiometer, a variable capacitor or a variable inductor.

It should be appreciated that the foregoing alternatives are presented by way of example, are not intended to limit the scope of the claims.

Appendix 1
A Computer Program For Implementing Constant Linear Velocity Control In An Optical Recording System © 1996 Disc Manufacturing, Inc.

The following is an interrupt service routine that carries out the control of the apparatus in Appendix 2 for maintaining an optical recording head at a constant linear velocity with respect to a rotating disk. The routine is written in the c++ programming language for the WINDOWS™ operating system.

```
// ---------- Interrupt handler to update the speed to maintain CLV
void Turntable::update_clv( )
{
/****************** spiral CLV scheme ******************/
        unsigned long divisor;
        unsigned int multiplier = 3;
        unsigned char byte;
        revcount += rpi;                                    // add revolutions since last interr
upt to total
        divisor = (revcount * aTranslate.get_pitch ( )) / 100;   // this is the radius in microns
        divisor += start_radius;                            // add the starting radius
        divisor /= 10;                                      // radius in tens of microns
        divisor /= 1v;
        _outp( TRRS, 0 );                                   // select register 0
        for( int i = 0; i < 4; i++ )      {                 // send 14 bits to N register
                byte = (char) (divisor & 0x0F );
                _outp( TTSYN, byte );                       // send a nibble to TTSYN
                divisor >>= 4;                              // move over to next nibble
        }
        _outp ( TTRS, 4 );                                  // select register 4
        for( i = 4; i < 7; i++ )      {                     // send 12 bits to R register
                byte = (char) ( multipler & 0x0F );
                _outp( TTSYN, byte );                       // send a nibble to TTSYN
                multiplier >>= 4;                           // move over to next nibble
        }
/********************************************************/
        set_bitC( TT_OUT, 3, 0 );                           // clear the interrupt flip-flop
        ms_delay( 1 );
        set_bitC( TT_OUT, 3, 1 );
}
// ---------- Member function to return the current track pitch in hundreths of a micron
long Translate::get_pitch( )
{
        return( long( track_pitch * 100 ) );
}
void ms_delay ( int n )                   // delay n milliseconds, up to 55
{
        unsigned int old_count;
        unsigned int new_count;
        unsigned int delay_count;
        delay_count = n * 1193;                             // there are 1193 counts per millisecond (?)
        _outp( 0x43, 0 );                                   // latch count of counter 0 on system board
        old_count = _inp( 0x40 );                           // LSB of count
        old_count += _inp( 0x40 ) << 8;                     // MSB of count
        new_count = old_count;
        while( (old_count - new_count) < delay_count ) {
                _outp( 0x43, 0 );                           // latch count of counter 0 on system board
```

-continued

```
        new_count = _inp ( 0x40 );         // LSB of ocunt
        new_count += _inp( 0x40 ) << 8;    // MSB of count
        }
}
// ********** The Device Class **********
// ---------- The constructor
Device::Device( )
{
}
// ---------- Member function to set an output bit (port C only)
static void Device::set_bitC( unsigned port, int bit, BOOL value )
{
        // D1-3 are bit select; D0 = 1 means set, D0 = 0 means reset
        // mask off value just in case its not 0 or 1
        bit = ( (bit & 7 ) << 1 ) | ( value & 1 );
        _outp( port, bit );
}
// ---------- Member function to set an output bit
void Device::set_bit( unsigned port, int bit, BOOL value )
{
}
// ---------- Member function to get an input bit
BOOL Device::get_bit( unsigned port, int bit )
{
        if( _inp( port ) & ( 1 << bit ) )
        return( TRUE );
        else return ( FALSE );
}
// ---------- Member function to get an input byte
int Device::get_byte( unsigned port )
{
        return( _inp( port ) );
}
// ---------- Member function to initialize an 8255
void Device::init( char pio )
{
}
// ---------- The destructor
Device::~Device( )
{
}
```

Appendix 2
Schematics For Rotation And Translation Controllers In A Constant Linear Velocity System © 1996 Disc 40 Manufacturing, Inc.

I claim:

1. An improvement in an optical recording system comprising an optical recording head, a rotatable disk support positioned in close proximity to the optical recording head and movable along a first path comprising a radial component and starting at an initial radial position, a translation motor for moving the rotatable disk support, a disk motor coupled to the disk support to rotate the disk support at a selectable angular velocity, a motion sensor coupled to the disk support and operative to generate a sensor signal indicative of rotation of the disk support, a translation controller operative to move the disk support along the first path, the improvement comprising:

a rotation controller responsive to the sensor signal and operative to determine a cumulative measure of rotation and to set the disk motor angular velocity as a function of the cumulative measure of rotation to maintain a selected linear velocity between the recording head and the rotating disk.

2. The improvement in claim 1:

wherein the sensor signal comprises a plurality of pulses;

wherein a cumulative number of the plurality of pulses is indicative of a rotational displacement of the disk support; and wherein the rotation controller comprises a first pulse counter responsive to the pulses.

3. The improvement in claim 2 wherein the rotation controller further comprises:

a pitch input for receiving a selected track pitch;

means for generating a count indicator signal upon receiving a fixed number of the plurality of pulses; and rotation determining means for determining the cumulative measure of rotation in response to the count indicator signal is generated, the cumulative measure of rotation determined as a function of the selected track pitch.

4. The improvement in claim 1 wherein the rotation controller comprises a phase-locked loop frequency synthesizer for generating a rotation control signal indicative of the disk motor angular velocity, the rotation control signal determined according to the cumulative measure of rotation and the selected linear velocity.

5. The improvement in claim 1 wherein the rotation controller comprises a frequency generator for generating a rotation control signal indicative of the disk motor angular velocity, the rotation control signal determined according to the cumulative measure of rotation and the selected linear velocity.

6. An improvement in an optical recording system comprising a rotatable disk support, an optical recording head positioned in close proximity to the rotatable disk support and movable along a first path comprising a radial component and starting at an initial radial position, a translation motor for moving the optical recording head, a disk motor coupled to the disk support to rotate the disk support at a selectable angular velocity, a motion sensor coupled to the disk support and operative to generate a sensor signal indicative of rotation of the disk support, the improvement comprising:

a translation controller operative to move the recording head along the first path; and a rotation controller responsive to the sensor signal and operative to determine a cumulative measure of rotation and to set the disk motor angular velocity as a function of the cumulative measure of rotation to maintain a selected linear velocity between the recording head and the rotating disk.

7. The improvement in claim 6:

wherein the sensor signal comprises a plurality of pulses;

wherein a cumulative number of the plurality of pulses is indicative of a rotational displacement of the disk support; and wherein the rotation controller comprises a first pulse counter responsive to the pulses.

8. The improvement in claim 7 wherein the rotation controller further comprises:

a pitch input for receiving a selected track pitch;

means for generating a count indicator signal upon receiving a fixed number of the plurality of pulses; and rotation determining means for determining the cumulative measure of rotation in response to the count indicator signal is generated, the cumulative measure of rotation determined as a function of the selected track pitch.

9. The improvement in claim 6 wherein the rotation controller comprises a phase-locked loop frequency synthesizer for generating a rotation control signal indicative of the disk motor angular velocity, the rotation control signal determined according to the cumulative measure of rotation and the selected linear velocity.

10. The improvement in claim 6 wherein the rotation controller comprises a frequency generator for generating a rotation control signal indicative of the disk motor angular velocity, the rotation control signal determined according to the cumulative measure of rotation and the selected linear velocity.

11. In an optical recording system, a method for maintaining a radially movable and rotatable disk at a constant linear velocity relative to an optical recording head, the method comprising the steps of:

generating a translation of the optical recording head relative to the rotatable disk support, the translation starting from an initial radial position along a radial path;

rotating the rotatable disk at an initial angular velocity;

determining a cumulative measure of rotation of the rotating disk; and updating the angular velocity of the rotating disk in response to the cumulative measure of rotation to maintain the constant linear velocity.

12. The method of claim 11 wherein the step of determining the cumulative measure of rotation comprises the steps of:

generating pulses in response to the rotation of the rotatable disk;

counting the pulses; and maintaining a pulse count; and wherein the step of determining the cumulative measure of rotation is responsive to the pulse count.

13. The method of claim 11 wherein the step of determining the cumulative measure of rotation further comprises the step of:

generating a count indicator signal each time a fixed number of pulses is counted; and determining a cumulative measure of rotation by retrieving a cumulative pulse count each time a count indicator signal is generated.

14. The method of claim 11 wherein the step of generating a translation further comprises the step of:

moving the rotatable disk support in a linear direction relative to the stationary optical recording head.

15. The method of claim 11 wherein the step of:

moving the optical recording head in a linear direction relative to the stationary rotatable disk support.

* * * * *